(12) United States Patent
Boykin et al.

(10) Patent No.: US 8,219,668 B2
(45) Date of Patent: Jul. 10, 2012

(54) RESOURCE PROPERTY AGGREGATION IN A MULTI-PROVIDER SYSTEM

(75) Inventors: James R. Boykin, Pflugerville, TX (US); Alberto Giammaria, Austin, TX (US); Patricia D. Griffin, Austin, TX (US); Mark W. Johnson, Austin, TX (US); Christopher A. Peters, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 12/241,547

(22) Filed: Sep. 30, 2008

(65) Prior Publication Data

US 2010/0083271 A1 Apr. 1, 2010

(51) Int. Cl.
*G06F 15/173* (2006.01)

(52) U.S. Cl. .......................................... 709/224

(58) Field of Classification Search ................... 718/104; 717/105
See application file for complete search history.

(56) References Cited

U.S. PATENT DOCUMENTS

| | | | |
|---|---|---|---|
| 5,311,422 A * | 5/1994 | Loftin et al. | 703/2 |
| 6,487,713 B1 * | 11/2002 | Cohen et al. | 717/105 |
| 6,985,941 B2 | 1/2006 | Schweitzer et al. | |
| 7,133,874 B2 * | 11/2006 | Hill et al. | 1/1 |
| 7,184,934 B2 | 2/2007 | Russell et al. | |
| 7,203,623 B2 | 4/2007 | Garcea et al. | |
| 2004/0225669 A1 | 11/2004 | Isaacson et al. | |
| 2005/0198275 A1 * | 9/2005 | D'Alo et al. | 709/224 |
| 2006/0235831 A1 | 10/2006 | Adinolfi et al. | |
| 2008/0052102 A1 | 2/2008 | Taneja et al. | |

* cited by examiner

*Primary Examiner* — Keith Vicary
(74) *Attorney, Agent, or Firm* — Francis Lammes; Stephen J. Walder, Jr.; Jeffrey S. LaBaw

(57) ABSTRACT

The present invention provides for resource property aggregation. A set of new instances is received from one or more providers. For each new instance in the set of new instances, a determination is made as to whether the new instance represents a same resource as at least one other instance. Responsive to determining that the new instance represents the same resource as another instance, a set of properties associated with the new instance and with the at least one other instance are identified. Each property from the new instance is compared to an associated property in the at least one other instance using a set of precedence rules. At least one property value is identified from either the new instance or the at least one other instance. An aggregate instance is then generated that represents the resource using the identified property values.

18 Claims, 3 Drawing Sheets

RESOURCE PROPERTY AGGREGATION IN A MULTI-PROVIDER SYSTEM

BACKGROUND OF THE INVENTION

1. Field of the Invention

The present application relates generally to an improved data processing apparatus and method and more specifically to an apparatus and method for performing resource property aggregation in a multi-provider system.

2. Background of the Invention

Common Information Model (CIM) Object Manager, Discovery Servers, etc., are examples of systems that handle interaction between management applications and providers. A Common Information Model (CIM) provides a data modeling environment in the form of object-like design diagrams and a language-neutral description of the model known as the Managed Object Format (MOF). A Distributed Management Task Force (DMTF) proceeds through iterations in a standards body to create a layered class hierarchy that correctly represents manageable elements from a variety of areas that require management. Each management area, such as storage or applications, is represented in a CIM schema. Different management areas are worked on by different DMTF standards bodies that specialize in those areas. A core schema is structured along the same lines as the Java™ platform class hierarchy. The core schema contains classes and associations that are common to all of the management areas. For example, all elements which can be managed inherit from a class known as a CIM_ManagedElement.

A CIM Object Manager (CIMOM) is a database for instances of CIM classes. CIMOMs represent the central point for accessing management resources. The entire CIM model and standard extensions are built for further extension by hardware and software vendors. Once a CIM model and MOF definition are complete, the package is imported into a CIM object manager (CIMOM). The CIMOM provides a central repository where clients in a network can go to gather information about managed resources within the system.

While a CIMOM provides access to resources from providers, a CIMOM fails to provide access to two or more providers that support the same class of resource. A CIMOM eliminates the possibility of providing access to two or more providers that support the same class of resource by defining that only one provider can be registered to provide instances for a specific resource class. Other systems retain the instance from the first provider and eliminate those from subsequent providers. These two solutions are far from optimal. The CIMOM solution is too limiting for customers that want to leverage information from two different management systems where each management system has its own unique strengths. An example of this is two storage management systems that discover Small Computer System Interface (SCSI) disks and have different strengths regarding properties of the SCSI disk class. The solution by other systems fails to allow the administrator to decide which of the different values for the same property is preferred.

BRIEF SUMMARY OF THE INVENTION

In one illustrative embodiment, a method, in a data processing system, is provided for resource property aggregation. The illustrative embodiment receives a set of new instances from one or more providers. For each new instance in the set of new instances, the illustrative embodiment determines if the new instance represents a same resource as at least one other instance. The illustrative embodiment identifies a set of properties associated with the new instance and a set of properties associated with the at least one other instance in response to determining that the new instance represents the same resource as another instance. For each property in the set of properties associated with the new instance, the illustrative embodiment compares the property to an associated property in the set of properties associated with the at least one other instance using a set of precedence rules. Based on the set of precedence rules, the illustrative embodiment identifies at least one property value from either the set of properties associated with the new instance or the set of properties associated with the at least one other instance to be used as at least one aggregate value for an aggregate instance that represents the resource. The illustrative embodiment generates the aggregate instance that represents the resource.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
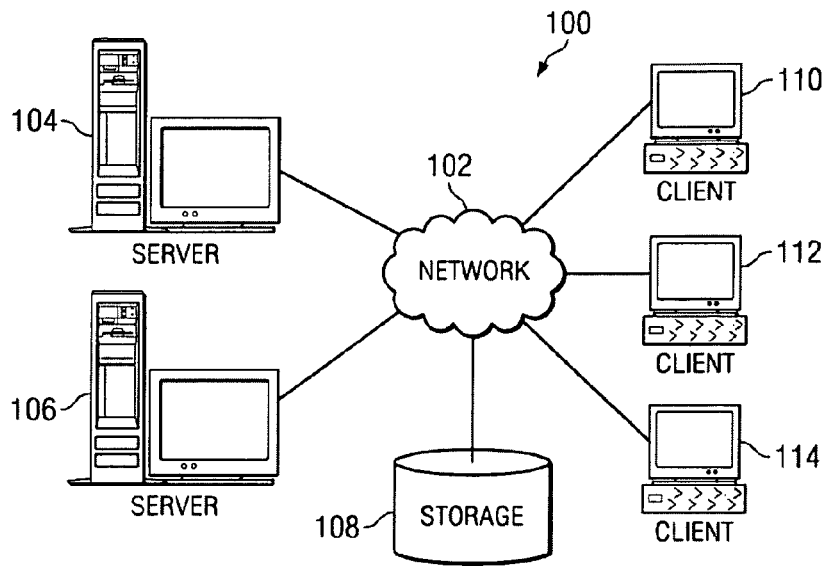
FIG. 1 depicts a pictorial representation of an example distributed data processing system in which aspects of the illustrative embodiments may be implemented.

The illustrative embodiments provide a mechanism for resource property aggregation in a multi-provider system. The mechanism proposed here provides a more flexible solution to the problem of instances that represent the same resource, by leveraging all the property values acquired by the different providers of the instances. Instead of simply eliminating all instances that represent the same resource except the instance from the first provider, the illustrative embodiments compose, for all instances that represent the same resource, an aggregate instance that combines the properties found in the instances in a meaningful way. Thus, the mechanisms of the illustrative embodiments include the "best" property values in each of the instances.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer, program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a mechanism that acquires instances for resources from multiple providers and exposes the instances from a single repository. The mechanism composes a new instance for instances that represent the same resource by combining properties found in the individual instances. The mechanism uses the "best" property values from each instance that represents the same resource to create an aggregate instance.

Figure 2:
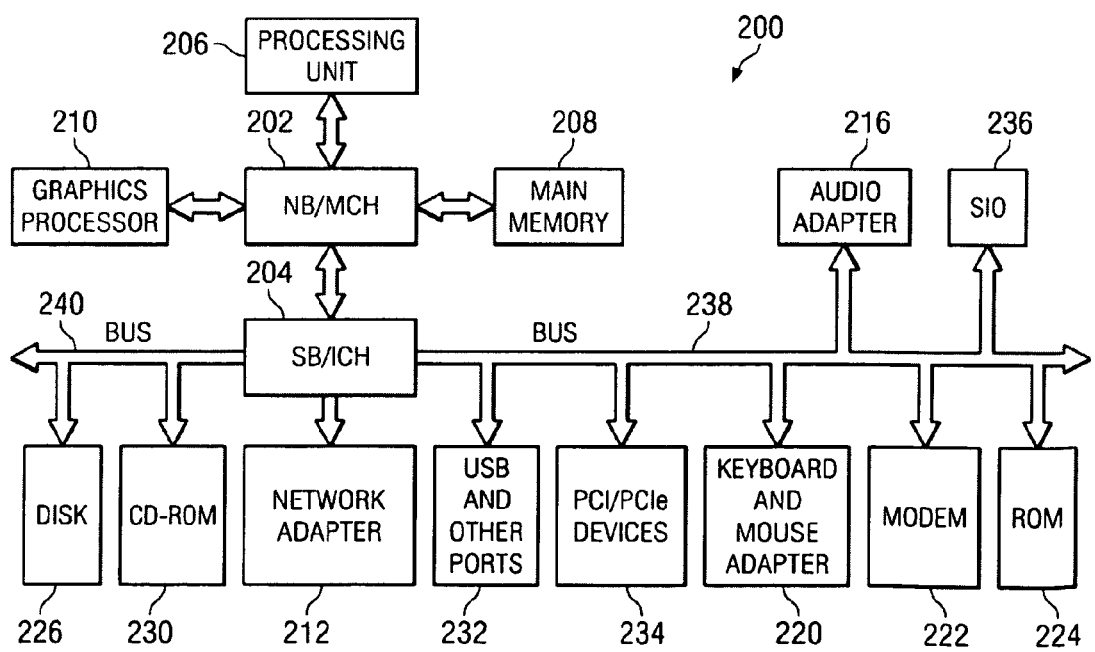
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a resource property aggregation mechanism, this is only an example and is not intended to state or imply any limitation with regard to the features of the present invention. To the contrary, the illustrative embodiments are intended to include distributed data processing environments and embodiments in which instances that represent the same resource are uniquely identified as a single aggregate instance.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative, embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
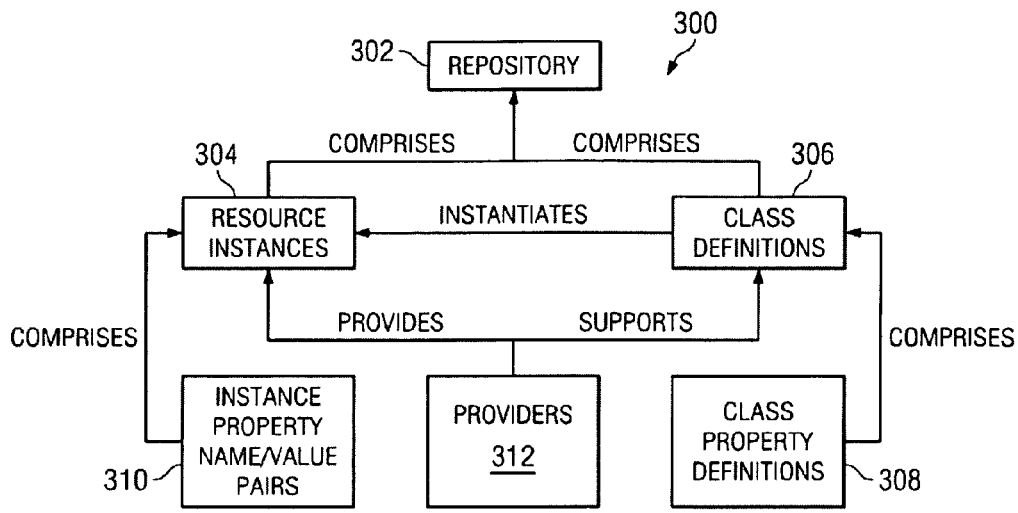
FIG. 3 depicts an example of a data processing system that acquires resource instances from multiple sources in accordance with an illustrative embodiment.

FIG. 3 depicts an example of a data processing system that acquires resource instances from multiple sources in accordance with an illustrative embodiment. Data processing system 300 comprises one or more of repository 302. Repository 302 may be either a physical repository or a logical repository. Repository 302 comprises resource instances 304 and class definitions 306 for each of resource instances 304. Each class definition in class definitions 306 instantiates a specific type of resource instance in resource instances 304. Each of class definitions 306 comprises a class property definition from class property definitions 308. Class definitions 306 may be grouped into packages and packages into models (not shown). Each of resource instances 304 comprises a set of instance property name and value pairs from instance property name/value pairs 310. Each of providers 312 supports specific resource classes in class definitions 306 and provides one or more of resource instances 304 from the sources from which providers 312 are connected.

Figure 4:
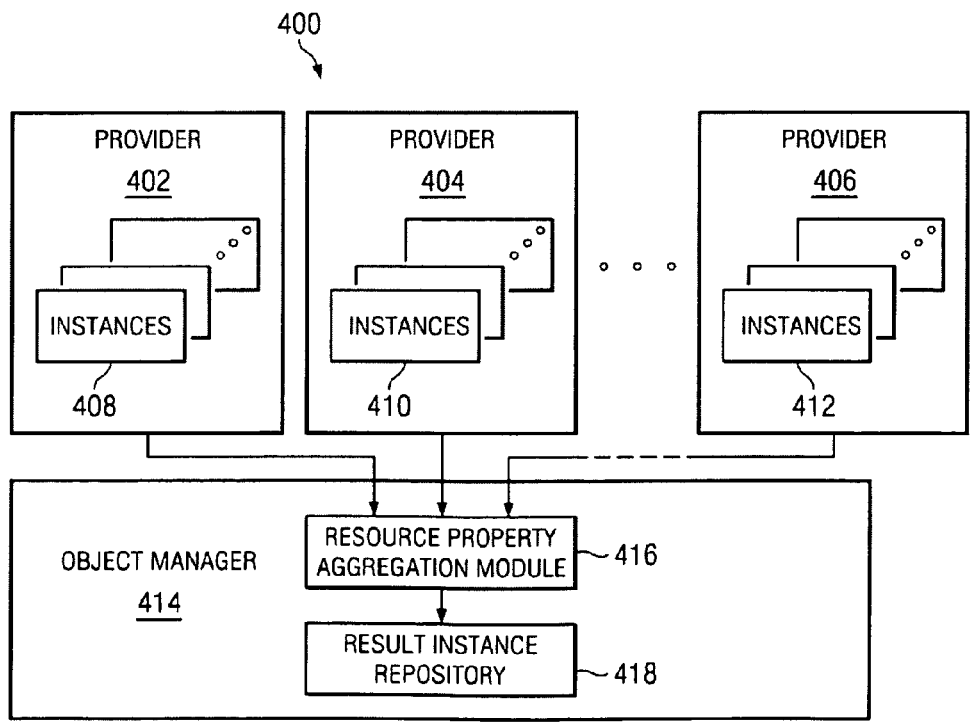
FIG. 4 depicts a data processing system that comprises a resource property aggregation mechanism in accordance with an illustrative embodiment.

FIG. 4 depicts a data processing system that comprises a resource property aggregation mechanism in accordance with an illustrative embodiment. In data processing system 400, providers 402, 404, and 406, each provide one or more of instances 408, 410, and 412, respectively, for one or more resources to object manager 414. Object manager 414 comprises resource property aggregation module 416 and result instance repository 418. Resource property aggregation module 416 receives an indication from providers 402, 404, and 406 of instances 408, 410, and 412 for one or more resources. Each of instances 408, 410, and 412 comprises one or more property values that identify a resource.

Upon receiving the indication of instances 408, 410, and 412, resource property aggregation module 416 examines each of instances 408, 410, and 412 to determine if one or more of instances 408, 410, or 412 represents the same resource that has an instance already stored as a result instance in result instance repository 418 or if one or more of instances 408, 410, or 412 is for the same resource as another one of instances 408, 410, or 412. If resource property aggregation module 416 determines that one or more instance represents the same resource as another instance, resource property aggregation module 416 identifies all of the property values associated with the instances for the same resource and a set of predetermined precedence rules.

The set of predetermined precedence rules may comprise ModelName, PackageName, ClassName, PropertyName, or the like, and/or one or more resource meta-properties. The ModelName value may identify the name of a model of the resource. The PackageName value may identify the name of the package of classes in the resource. The ClassName value may identify the name of the instance class of the resource. The PropertyName value may identify the name of the instance property of the resource. The one or more resource meta-properties may comprise ProviderName, LastModificationTime, or the like. The ProviderName value may identify the name of the provider that acquired the property values. Finally, the LastModificationTime value may identify a date and a time the property values of the resource were acquired.

Using the identified property values and the set of predetermined precedence rules that identify how and an order in which the property values should be analyzed, resource property aggregation module 416 uses property values from the instances that represent the same resource to create an aggregated instance. That is, when resource property aggregation module 416 identifies multiple instances that represent the same resource (by property or properties), resource property aggregation module 416 traverses the predetermined precedence rules applicable to each property to determine an aggregate property value. These aggregate property values are then combined to create an aggregate instance which is then stored or updated in result instance repository 418 and/or sent to a client.

The predetermined precedence rules may be registered by the user in different grain sizes. Grain sizes that may be used by the user may include ModelName, PackageName, ClassName, PropertyName, or the like. The winning rule for each property may be determined by the first rule that satisfies one or more conditions. One condition that may be required to be met is for a rule to be considered applicable to a property if the property's ModelName, PackageName, ClassName, PropertyName, or the like, matches the predetermined precedence rules. Examples of matching predetermined precedence rules include ModelName (e.g. cdm), PackageName (e.g. cdm.sys), ClassName (e.g. cdm.sys.VMwareComputerSystem) and PropertyName (e.g. cdm.sys.VMwarcComputerSystem.CPU-GUID). Another condition that may be required to be met for the rule to be considered applicable to a property is if the action of the rule applies. Actions include ProviderName and FreshestValue. In order for a ProviderName action to complete the applicability of a rule, the property value being considered may be required to come from the correctly-named provider. In order for the FreshestValue rule to be applied, the source instance of the property may be required to have a peer property named LastModifiedTime with a non-null value and that LastModifiedTime value must be the most recent. Usage of the predetermined precedence rules may be orderable by the user in any way the user sees fit.

In order to provide an example of the process performed by resource property aggregation module 416, the following provides an example of the predetermined precedence rules, contrived data instances of an example cdm.sys.VMwareComputerSystem, and resolved aggregate data for instances that represent the same resources. Resource property aggregation module 416 performs resolution for each named property individually. Resource property aggregation module 416 does not apply the predetermined precedence rules unless multiple providers are sources of same-named instances for a same resource. The predetermined precedence rules are defined in a precedence order as defined by the user. When one of the predetermined precedence rules for a property is found to apply, additional predetermined precedence rules are not required to be evaluated because a "winning" rule has already been found.

The following is an example of a set of predetermined precedence rules:

1. cdm.sys.VMwareComputerSystem.CPU-GUID: Intel-Provider

This rule will only apply to the CPU-GUID property of the class cdm.sys.VMwareComputerSystem. Also, the provider of the instance must be the Intel-Provider for this rule to "win". The Intel-Provider will provide the value for the CPU-GUID property for the aggregated instance.

2. cdm.sys.VMwareComputerSystem.CPU-GUID: ESX-Provider

This rule will only apply to the CPU-GUID property of the class cdm.sys.VMwareComputerSystem. Also, the source of the instance must be the ESX-Provider for this rule to "win". If the prior rule favoring the Intel-Provider for this property has already "won", this rule need not even be visited for this property. However, if the provider of this property is the ESX-Provider, this rule will "win" and provide the value for the CPU-GUID property for the aggregated instance.

3. cdm.sys.VMwareComputerSystem: VMware VC-Provider

This rule will apply to all properties of the class cdm.sys.VMwareComputerSystem. One of those properties will probably be the CPU-GUID (which may qualify for rule 1 or 2), but there will be other properties such as Name, MACAddress, etc. If either rule 1 or 2 has been determined as applicable, this rule will not be visited.

4. cdm.sys: Freshest value

This rule will apply to all properties of any class contained within the cdm.sys package. This includes the cdm.sys.VMwareComputerSystem as well as other classes like cdm.sys.OperatingSystem, cdm.sys.DiskDrive, etc. This rule will only come into play if none of the prior 3 rules do not qualify for a particular property.

5. Default, unregistered rule is to take the property value from the first provider that provides a non-null value. This default rule will not be applicable for a property if any of the above 4 rules apply.

The following is an example of a set of contrived data instances of cdm.sys.VMwareComputerSystem. Some of the values used in the following set of contrived data instances are unnaturally short for example purposes.

From Intel-Provider
Instance 1:
    CPU-GUID=1
    MACAddress=2
    Name="George"
    LastModifiedTime=Nov. 12, 2007
From ESX-Provider
Instance 2:
    CPU-GUID=10
    MACAddress=2
    Name="John"
    LastModifiedTime=Nov. 13, 2007
Instance 3
    CPU-GUID=20
    MACAddress=3
    Name="Thomas"
    LastModifiedTime=Dec. 1, 2007
From VMware VC-Provider
Instance 4:
    CPU-GUID=100
    MACAddress=3
    Name="Abraham"
    LastModifiedTime=Jan. 1, 2008
From Other-Provider
Instance 5
    CPU-GUID=1000
    MACAddress=4
    Name="Theodore"
    LastModifiedTime="Feb. 1, 2008"

The following is an example of applying the set of predetermined precedence rules exemplified above to the set of contrived data instances exemplified above to generate the following result aggregate instances. Using the MACAddress property as the instance identifier the aggregated instances are the following:

Instance 1 and 2 combine to create the following aggregate instance since both Instance 1 and Instance 2 have a MACAddress=2.
    CPU-GUID=1 (Resource property aggregation module 416 applies Rule 1 since Instance 1 is provided by Intel-Provider and Instance 2 is provided by ESX provider and Rule 1 is in precedence order before Rule 2.)
    MACAddress=2 (Resource property aggregation module 416 identifies this property value as the identified property value used in both Instance 1 and 2.)
    Name="John" (Resource property aggregation module 416 does not apply Rules 1 and 2 to this property since this is not the CPU-GUID property. Resource property aggregation module 416 does not apply Rule 3 since Rule 3 is only for instances coming from the VMware VC-Provider and neither Instance 1 nor Instance 2 have an instance with a MACAddress of 2 coming from the VMware VC-Provider. However, resource property aggregation module 416 applies Rule 4 using freshest value according to the more recent date of Instance 2, which is Nov. 13, 2007.)
    LastModifiedTime="Nov. 13, 2007" (Resource property aggregation module 416 does not apply Rules 1 and 2 to this property since this is not the CPU-GUID property. Resource property aggregation module 416 does not apply Rule 3 since Rule 3 is only for instances coming from the VMware VC-Provider and neither Instance 1 nor Instance 2 have an instance with a MACAddress of 2 coming from the VMware VC-Provider. However, resource property aggregation module 416 applies Rule 4 using freshest value according to the more recent date of Instance 2, which is Nov. 13, 2007.)
Instance 3 and 4 combine to create the following aggregate instance since both Instance 3 and Instance 4 have a MACAddress=3.
    CPU-GUID=20 (Resource property aggregation module 416 does not apply Rule 1 since the Intel-Provider does not provide an instance with a MACAddress value of 3. However, resource property aggregation module 416 applies. Rule 2 since Instance 3 is provided by ESX-Provider.)
    MACAddress=3 (Resource property aggregation module 416 identifies this property value as the identified property value used in both Instance 1 and 2.)

Name="Abraham" (Resource property aggregation module 416 does not apply Rules 1 and 2 to this property since this is not the CPU-GUID property. However, resource property aggregation module 416 applies Rule 3 since Instance 4 is provided by VMware VC-Provider.)

LastModifiedTime="Jan. 1, 2008". (Resource property aggregation module 416 does not apply Rules 1 and 2 to this property since this is not the CPU-GUID property. However, resource property aggregation module 416 applies Rule 3 since. Instance 4 is provided by VMware VC-Provider.)

Instance 5, which resource property aggregation module 416 identifies as having no duplicate-named instances based on having a MACAddress=4, is used in its entirety. There is no requirement to traverse and evaluate precedence rules in this case since there are no duplicate-named instances.

CPU-GUID=1000
MACAddress=4
Name="Theodore"
LastModifiedTime="Feb. 1, 2008"

Thus, the analysis performed by the resource property aggregation module provides a more flexible solution to the problem of resource instances that represent the same resource, by leveraging all the property values acquired by the different providers. Instead of simply eliminating all resource instances that represent the same resource, except the resource instance from the first provider, the resource property aggregation module analyzes the properties between the instances and combines the properties found in each instance in a meaningful way.

Figure 5:
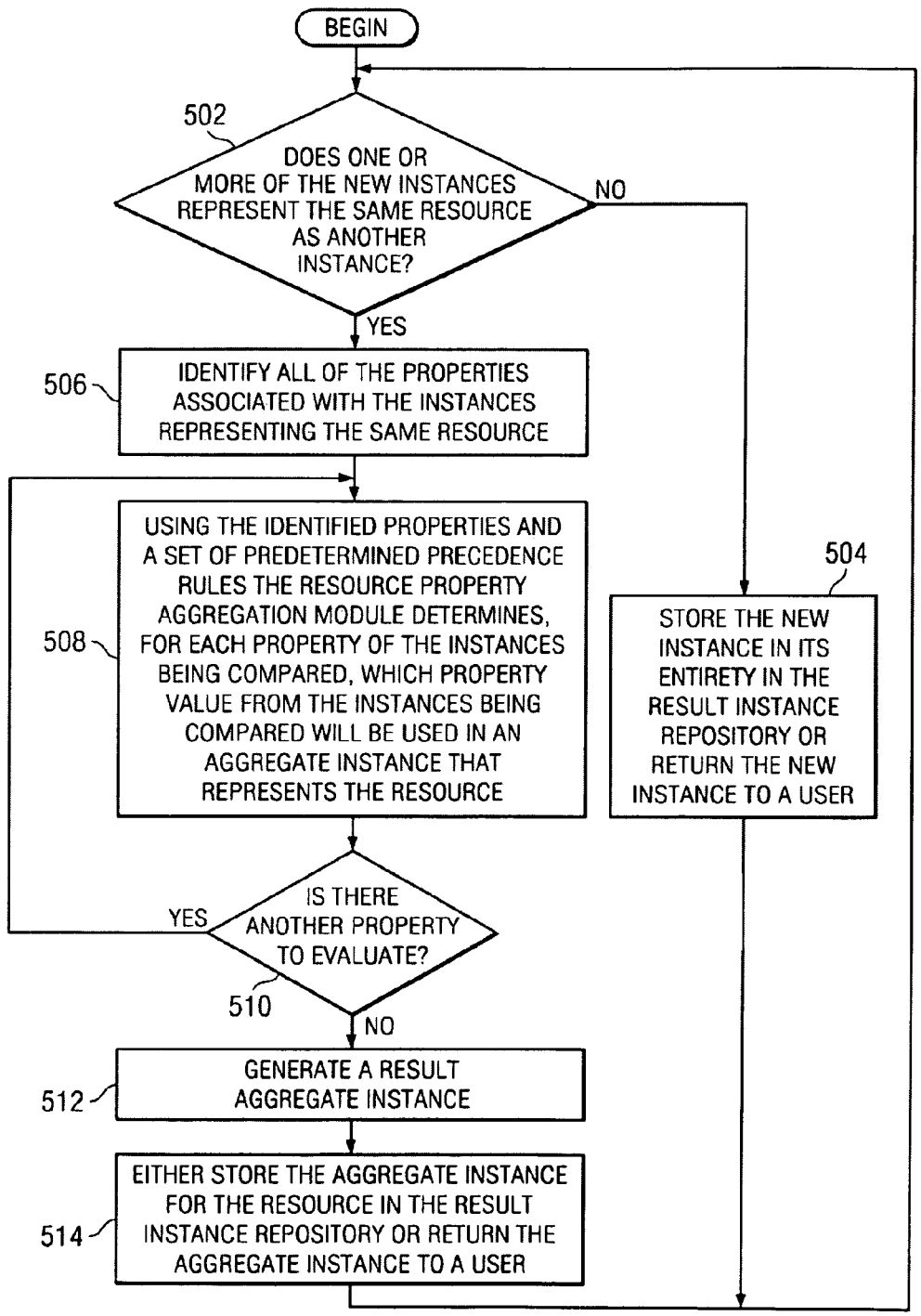
FIG. 5 depicts an example of the operation performed by a resource property aggregation module in accordance with an illustrative embodiment.

FIG. 5 depicts an example of the operation performed by a resource property aggregation module in accordance with an illustrative embodiment. As the operation begins, the resource property aggregation module examines received new instances to determine if one or more of the new instances represent the same resource as an instance already stored as a result instance in a result instance repository or if one or more of the new instances represent a same resource as another newly received instance (step 502). For each new instance, if at step 502 the resource property aggregation module determines that the new instance and the instance to which the new instance is being compared do not represent the same resource, then the resource property aggregation module stores the new instance in its entirety in the result instance repository or returns the new instance to a user (step 504), with the operation returning to step 502 thereafter.

If at step 502 the resource property aggregation module determines that the new instance and the instances to which the new instance is being compared represent the same resource, the resource property aggregation module identifies all of the properties associated with the instances representing the same resource (step 506). Using the identified properties and a set of precedence rules, which are in a precedence order predetermined by the user, the resource property aggregation module determines, for each property of the instances being compared, which property value from the instances being compared will be used in an aggregate instance that represents the resource (step 508). After each property is resolved, the resource property aggregation module determines if there is another property to evaluate (step 510).

If at step 510 the resource property aggregation module determines that there is another property to evaluate, then the operation returns to step 508. If at step 510 the resource property aggregation module determines that there is not another property to evaluate, the resource property aggregation module generates a result aggregate instance (step 512). Then the resource property aggregation module either stores the aggregate instance for the resource in the result instance repository or returns the aggregate instance to a user (step 514), with the operation returning to step 502 thereafter.

Thus, the illustrative embodiments provide a mechanism that acquires instances from multiple sources and exposes them from a single repository. The mechanism composes new instances for instances that represent the same resource by combining properties found in the individual instances. The mechanism uses the "best" property values from each instance to create aggregate instances that are individually identified.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for resource property aggregation, the method comprising:

receiving a set of new instances from one or more providers;

for each new instance in the set of new instances, determining if the new instance represents a same resource as at least one other instance;

responsive to determining that the new instance represents the same resource as the another instance, identifying a set of properties associated with the new instance and a set of properties associated with the at least one other instance;

for each property in the set of properties associated with the new instance, comparing the property to an associated property in the set of properties associated with the at least one other instance using a set of precedence rules, wherein the set of precedence rules comprises at least one of a ModelName, PackageName, ClassName, PropertyName or a set of resource meta-properties, wherein the ModelName identifies a name of a model of the resource, wherein the PackageName identifies a name of a package of classes in the resource, wherein the ClassName identifies a name of an instance class of the resource, wherein the PropertyName identifies a name of an instance property of the resource, wherein the set of resource meta-properties comprises at least one of a ProviderName or a LastModificationTime, wherein the ProviderName identifies a name of a provider that acquired a set of property values, and wherein the LastModificationTime identifies a date and a time the set of property values of the resource were acquired;

based on the set of precedence rules, identifying at least one property value from either the set of properties associated with the new instance or the set of properties associated with the at least one other instance to be used as at least one aggregate value for an aggregate instance that represents the resource; and generating the aggregate instance that represents the resource.

2. The method of claim 1, wherein the aggregate instance is stored in a result instance repository.

3. The method of claim 1, wherein the aggregate instance is sent to a user.

4. The method of claim 1, wherein the at least one other instance is already stored as at least one result instance in a result instance repository.

5. The method of claim 1, wherein the at least one other instance is in the set of new instances.

6. The method of claim 1, further comprising:
responsive to determining that the new instance fails to represent the same resource as the at least one other instance, storing the new instance in its entirety in a result instance repository.

7. The method of claim 1, further comprising:
responsive to determining that the new instance fails to represent the same resource as the at least one other instance, sending the new instance to a user.

8. The method of claim 1, wherein the set of precedence rules is predetermined by a user.

9. A computer program product comprising a non-transitory computer recordable medium having a computer readable program recorded thereon, wherein the computer readable program, when executed on a computing device, causes the computing device to:

receive a set of new instances from one or more providers;

for each new instance in the set of new instances, determine if the new instance represents a same resource as at least one other instance;

responsive to determining that the new instance represents the same resource as the another instance, identify a set of properties associated with the new instance and a set of properties associated with the at least one other instance;

for each property in the set of properties associated with the new instance, compare the property to an associated property in the set of properties associated with the at least one other instance using a set of precedence rules, wherein the set of precedence rules comprises at least one of a ModelName, PackageName, ClassName, PropertyName or a set of resource meta-properties, wherein the ModelName identifies a name of a model of the resource, wherein the PackageName identifies a name of a package of classes in the resource, wherein the ClassName identifies a name of an instance class of the resource, wherein the PropertyName identifies a name of an instance property of the resource, wherein the set of resource meta-properties comprises at least one of a ProviderName or a LastModificationTime, wherein the ProviderName identifies a name of a provider that acquired a set of property values, and wherein the LastModificationTime identifies a date and a time the set of property values of the resource were acquired;

based on the set of precedence rules, identify at least one property value from either the set of properties associated with the new instance or the set of properties associated with the at least one other instance to be used as at least one aggregate value for an aggregate instance that represents the resource; and generate the aggregate instance that represents the resource.

10. The computer program product of claim 9 wherein the aggregate instance is either stored in a result instance repository or sent to a user.

11. The computer program product of claim 9, wherein the at least one other instance is either already stored as at least one result instance in a result instance repository or is in the set of new instances.

12. The computer program product of claim 9, wherein the computer readable program further causes the computing device to:

responsive to determining that the new instance fails to represent the same resource as the at least one other instance, either store the new instance in its entirety in a result instance repository or send the new instance to a user.

13. The computer program product of claim 9, wherein the set of precedence rules is predetermined by a user.

14. An apparatus, comprising:
a processor; and
a memory coupled to the processor, wherein the memory comprises instructions which, when executed by the processor, cause the processor to:

receive a set of new instances from one or more providers;

for each new instance in the set of new instances, determine if the new instance represents a same resource as at least one other instance;

responsive to determining that the new instance represents the same resource as the another instance, identify a set of properties associated with the new instance and a set of properties associated with the at least one other instance;

for each property in the set of properties associated with the new instance, compare the property to an associated property in the set of properties associated with the at least one other instance using a set of precedence rules, wherein the set of precedence rules comprises at least one of a ModelName, PackageName, ClassName, PropertyName or a set of resource meta-properties, wherein the ModelName identifies a name of a model of the resource, wherein the PackageName identifies a name of a package of classes in the resource, wherein the ClassName identifies a name of an instance class of the resource, wherein the PropertyName identifies a name of an instance property of the resource, wherein the set of resource meta-properties comprises at least one of a ProviderName or a LastModificationTime, wherein the ProviderName identifies a name of a provider that acquired a set of property values, and wherein the LastModificationTime identifies a date and a time the set of property values of the resource were acquired;

based on the set of precedence rules, identify at least one property value from either the set of properties associated with the new instance or the set of properties associated with the at least one other instance to be used as at least one aggregate value for an aggregate instance that represents the resource; and generate the aggregate instance that represents the resource.

15. The apparatus of claim 14, wherein the aggregate instance is either stored in a result instance repository or sent to a user.

16. The apparatus of claim 14, wherein the at least one other instance is either already stored as at least one result instance in a result instance repository or is in the set of new instances.

17. The apparatus of claim 14, wherein the instructions further cause the processor to:

responsive to determining that the new instance fails to represent the same resource as the at least one other instance, either store the new instance in its entirety in a result instance repository or send the new instance to a user.

18. The apparatus of claim 14, wherein the set of precedence rules is predetermined by a user.

* * * * *